United States Patent [19]
Yale et al.

[11] 3,714,192
[45] Jan. 30, 1973

[54] DERIVATIVES OF 5,11-DIHYDRODIBENZOXAZEPINES AND PROCESS THEREFOR

[75] Inventors: Harry L. Yale, New Brunswick; Francis A. Sowinski, Edison, both of N.J.

[73] Assignee: E. R. Squibb & Sons, Inc., New York, N.Y.

[22] Filed: Sept. 28, 1970

[21] Appl. No.: 76,285

Related U.S. Application Data

[63] Continuation-in-part of Ser. No. 668,632, Sept. 18, 1967, abandoned, which is a continuation-in-part of Ser. No. 438,406, March 9, 1965, abandoned.

[52] U.S. Cl. ....... 260/333, 260/293.58, 260/268 TR, 260/243 B, 260/247.5 R, 260/326.5 CA, 424/246, 424/248, 424/250, 424/267, 424/274, 424/244
[51] Int. Cl. ............................................. C07d 87/54
[58] Field of Search .......... 260/333, 293.58, 368 TR 260/243 B, 260/247.5 R, 326.5 CA

[56] References Cited

UNITED STATES PATENTS

| | | | |
|---|---|---|---|
| 3,069,432 | 12/1962 | Yale et al. | 260/333 |
| 3,387,002 | 6/1968 | Yale et al. | 260/327 |

*Primary Examiner*—Norma S. Milestone
*Attorney*—Lawrence S. Levinson, Merle J. Smith, Donald J. Perella and Burton Rodney

[57] ABSTRACT

This invention relates to novel derivatives of 5,11-dihydrodibenzoxazepines having the formula

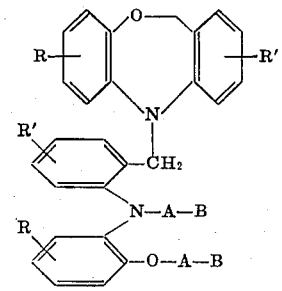

and acid-addition salts thereof, wherein A is lower alkylene of at least two carbon atoms, B is a basic saturated nitrogen-containing radical of less than 12 carbon atoms, and R and R' each are selected from the group consisting of hydrogen, halogen, lower alkyl, lower alkoxy, trifluoromethyl, trifluoromethylmercapto, trifluoromethoxy and N,N-dimethylamino-sulfonyl.

The compounds of this invention are therapeutically active materials which are useful hypotensive agents and for the control of the growth of tumors. In addition, they find utility as antibacterial and antifungal agents.

7 Claims, No Drawings

DERIVATIVES OF 5,11-DIHYDRODIBENZOXAZEPINES AND PROCESS THEREFOR

RELATED APPLICATIONS

This application is a continuation-in-part of copending application Ser. No. 668,632 filed Sept. 18, 1967 and now abandoned, which in turn is a continuation-in-part of copending application Ser. No. 438,406 filed Mar. 9 1965, now abandoned.

This invention relates to new chemical compounds and, more particularly, to certain new derivatives of 5,11-dihydrodibenz-oxazepines.

In U.S. Pat. No. 3,069,432, granted Dec. 18, 1962 to Yale et al., there is described a new class of chemical compounds of the formula I:

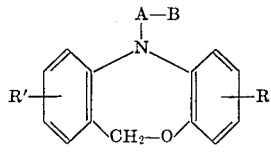

I and non-toxic acid-addition salts thereof, wherein A is lower alkylene of at least two carbon atoms, B is a basic saturated nitrogen-containing radical of less than 12 carbon atoms, and R and R' are the same or different and represent hydrogen, halogen, lower alkyl, lower alkoxy, trifluoromethyl, trifluoromethylmercapto, trifluoromethoxy or N,N-dimethylaminosulfonyl. Among the suitable radicals represented by the symbol B are mentioned: (lower alkyl)amino; di(lower alkyl)amino; (hydroxy-lower alkyl)amino; di(hydroxy0lower alkyl)amino; and basic saturated five to six membered N-heterocyclic radicals of less than 12 carbon atoms, as exemplified by piperidyl [i.e., piperidino, 2-piperidyl, 3-piperidyl and 4-piperidyl]; (lower alkyl)piperidyl [e.g., 2, 3, or 4-(lower alkyl)piperidino or 2, 3, or 4-(N-lower alkyl)piperidyl]; di(lower alkyl)piperidyl [e.g., 2,4-, 2,5- or 3,5-di(lower alkyl)piperidino, or 2, 3, or 4-(N-lower alkyl- 2, 3 or 4-(lower alkyl)piperidyl]; (lower alkoxy)piperidyl; pyrrolidyl; (lower alkyl)pyrrolidyl; di(lower alkyl)pyrrolidyl; (lower alkoxy)pyrrolidyl; di(lower alkyl)pyrrolidyl; (lower alkoxy)pyrrolidyl; morpholinyl [i.e., morpholino, 2-morpholinyl and 3-morpholinyl]; (lower alkyl)morpholinyl; di (lower alkyl)morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazyl; (lower alkyl)piperazyl (e.g., 4-methylpiperazino); di(lower alkyl)piperazyl; (lower alkoxy)piperazyl; (hydroxy-lower alkyl)piperazyl [e.g., 4-(2-hydroxyethyl)piperazino]; (lower alkanoyloxy-alkyl)piperazyl [e.g., 4-(2-acetoxyethyl)piperazino]; (hydroxy-lower alkoxy-lower alkyl)piperazinyl [e.g., 4-(2-hydroxyethoxyethyl)piperazino]; and (carbo-lower alkoxy)piperazyl [e.g., 4-(2carbomethoxy, carbe-thoxy, or carbopropoxy)piperazino].

This patent further teaches that such compounds can be formed by interacting a compound of the formula II:

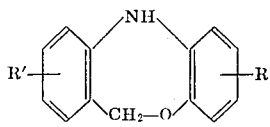

II wherein R and R' are as hereinbefore defined, with an aminoalkyl halide of the formula: B—A—(halo), wherein A and B are as hereinbefore defined, in the presence of a basic condensation reagent such as sodium hydride.

It has now been found that if this reaction is conducted using an excess of the basic condensation agent and an equivalent excess of aminoalkyl halide, for example, at least 2 moles of each per mole of compound of the formula II, a second compound is also formed. This second compound, which represents the new compounds of this invention, are of the formula III:

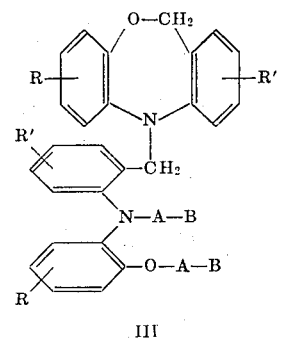

III and salts thereof, wherein A, B, R and R' are as hereinbefore defined.

As to the salts, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic, and succinic acid.

The new compounds of this invention (the compounds of formula III and their non-toxic acid-addition salts) are therapeutically active compounds which are utilizable both as hypotensive agents and for the control of the growth of tumors, such as Sarcoma 180 tumors, in mice. For these purposes they may be administered orally or parenterally to various animal species, such as rats, monkeys, dogs, horses, and the like, in conventional dosage forms such as tablets, capsules, elixirs, injectables, and the like, by incorporating the appropriate dose of the compound with carriers according to acceptable pharmaceutical practice.

For use as hypotensive agents in animal species such as the above, the suitable dosage would range from 7 to 12 mg./kg. of body weight daily.

For use in control of tumor growth in animal species such as the above, the suitable dosage would range from 10 to 60 mg./kg. of body weight daily.

In addition the above compounds of the instant invention are useful as antibacterial and antifungal agents, for instance against such organisms as *Mycobacterium tuberculosis*, *Trichophyton mentagrophytes*, *Fusarium bulbigenum*, and the like. As such they may be employed as antiseptics or disinfectants for the control or elimination of airborne or environmental microorganisms, e.g., in sprays, aqueous solutions, emulsions, or suspensions of up to about 10 percent concentration.

The following examples illustrate the invention (all temperatures being in centigrade):

EXAMPLE 1

5-[o-[2-(Dimethylamino)ethoxy]-N-[2-(dimethylamino)-ethyl]-anilino]benzyl]-5,11-dihydrodibenz[b,e]1,4]oxazepine

To 197.6 g. of 5,11-dihydrodibenz[b,e][1,4]oxazepine in 2 liters of dry tetrahydrofuran is added in small portions a total of 60 g. of a 50 percent dispersion of sodium hydride in mineral oil. The mixture is then stirred for ½ hour, 161.2 g. of 2-dimethylaminoethyl chloride is added dropwise, and the whole stirred and refluxed for 2 hours. The mixture is allowed to cool to room temperature and treated again with 48 g. of 50 percent sodium hydride and 107 g. of 2-dimethylaminoethyl chloride. Subsequently, the whole is stirred and refluxed for 5 hours, filtered, and the filtrate concentrated to dryness in vacuo. The residue is dissolved in 1 liter of ether and the ether solution extracted successively with 1 liter and then with 500 ml. of 10 percent aqueous phosphoric acid. The acid extracts are treated with an excess of solid potassium carbonate and the crude base, about 275.6 g., isolated via ether extraction. The crude base is subjected to distillation to yield about 145.6 g. of product 5-(2-dimethylaminoethyl)-5,11-dihydrobenz[b,e][1,4]oxazepine.

The residue from the distillation solidifies on cooling. Recrystallization from acetone gives 5-[o-[-[2-(dimethylaminoethoxy]-N-[2-(dimethylamino)ethyl]anilino]-benzyl]-5,11-dihydrodibenz[b,e][1,4]oxazepine, m.p. about 123°–125°.

Anal. Calcd. for $C_{34}H_{40}N_4O_2$: C, 76.08; H, 7.51; N, 10.44 ; N.E. 268.4; Molecular Wt., 536,72.
Found: C, 75.80; H, 7.78; N, 10.79; N.E. ($HClO_4$), 273.5; Molecular Wt. (osmometrically), 541.0.

EXAMPLE 2

5-[o-[o -[3-(Dimethylamino)propoxy]-N-[3-(dimethylamino)-propyl]anilino]benzyl]-5,11-dihydrodibenz[b,e]1,4]-oxazepine Following the procedure of Example 1 but substituting an equivalent amount of 3-dimethylaminopropyl chloride for the 2-dimethylaminoethyl chloride, 5-[o-[o -[3-(dimethylamino)pro-poxy]-N-[3-(dimethylamino)propyl]anilino]benzyl]-5,11-dihydrodi-benz[b,e][1,4]oxazepine is formed.

EXAMPLE 3

5-[o-[o -[2-(dimethylamino)ethoxy]-N-[2-dimethylamino)-ethyl]-anilino]benzyl]-5,11-dihydrodibenz[b,e]1,4]oxazepine hydrochloride To 5-[o-[o -[2-(dimethylamino)ethoxy]-N-[2-(dimethylamino)-ethyl]anilino]benzyl]-5,11-dihydrodibenz[b,e]1,4]oxazepine in dry ether is added dropwise, with ice cooling, a solution of dry hydrogen chloride in dry ether. The precipitate which forms is allowed to granulate and then is rapidly filtered under anhydrous conditions. The hygroscopic product is freed of solvent in vacuo to give the hydrochloride salt as an amorphous product.

EXAMPLE 4

7-Chloro-5-[o-[5-chloro-2[2-(dimethyl)ethoxy]-N-[2-(dimethylamino)ethyl]-anilino]benzyl-5,11-dihydrodibenz[b,e][1,4]-oxazepine Following the procedure of Example 1 but substituting an equivalent amount of 7-chloro-5,11-dihydrodibenz[b,e][1,4] oxazepine for the oxazepine reactant, the above-identified product is obtained.

EXAMPLE 5

5-[o[o-[2-(Dimethylamino)ethoxy]-N-[2-dimethylamino)ethyl]-5-(trifluoromethyl)anilino] benzyl-5,11-dihydro-7-(trifluoromethyl)-dibenz[b,e][1,4]oxazepine Following the procedure of Example 1 but substituting an equivalent amount of 7-trifluoromethyl-5,11-dihydrodibenz(b,e][1,4]-oxazepine for the oxazepine reactant, the above-identified product is obtained.

EXAMPLE 6

3,7-Dichloro-5-[4-chloro-2-[5-chloro-2-[2-(dimethylamino)-ethoxyl]-N-[2-(dimethylamino)ethyl]-anilino]benzyl]-5,11-dihydrodibenz[b,e][1,4]oxazepine Following the procedure of Example 1 but substituting an equivalent amount of 3,7-dichloro-5,11-dihydrodibenz[b,e][1,4]-oxazepine for the oxazepine reactant, the above-identified product is obtained.

EXAMPLE 7

5,11-Dihydro-5-]o-[o-[3-(4-methylpiperazino)propoxy]-N-[3- (4-methylpiperazino)propyl]nilino]benzyl]dibenz[b,e] [1,4]oxazepine Following the procedure of Example 1 but substituting an equivalent amount of 3-(4-methylpiperazino)propyl chloride for the 2-dimethylaminoethyl chloride, the above-identified product is formed.

EXAMPLE 8

5,11-dihydro-5-[o-[o-[3-[4-(2-hydroxyethyl)piperazino]ropoxy]-N-[3-[4-(2-hydroxyethyl)piperazino]ropyl]anilino]-benzyl]dibenz-[b,e][1,4]oxazepine Following the procedure of Example 1 but substituting an equivalent amount of 3-[4-(2-hydroxyethyl)piperazino]propyl chloride for the 2-dimethylaminoethyl chloride, the above-identified product is formed.

EXAMPLES 9–24

Following the procedure of Example 1 but substituting for 5,11-dihydrodibenz[b,e][1,4]oxazepine the oxazepine compound indicated in Column I, and substituting for 2-dimethylaminoethyl chloride the compound, B—A—Cl, indicated in Column II, there is obtained the compound indicated in Column III. The compounds of Column II are prepared by refluxing an amine, B—H, with an α, ω-chlorobromoalkane, Cl—A—Br, in dry chloroform. The procedure is as follows: to a solution containing 1.0 mole of the α, ω-chlorobromoalkane in 500 ml of dry chloroform there is added dropwise 1.0 mole of the anhydrous nitrogen base in 250 ml of chloroform; when the addition is complete the mixture is refluxed for three hours to give the B—A—Cl compound of Column II.

| I Oxazepine | II B—A—Cl | III Product |
|---|---|---|
| 9. | CH₃NHC₂H₄Cl | |
| 10. | HOC₂H₄N(CH₃)C₂H₄Cl | |
| 11. | | |
| 12. | | |

| I Oxazepine | II B—A—Cl | III Product |
|---|---|---|

13, 14, 15, 16 — structures not transcribed (chemical diagrams).

| I Oxazepine | II B—A—Cl | III Product |
|---|---|---|
| 17. 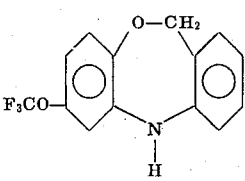 | 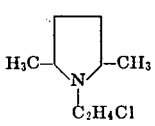 | 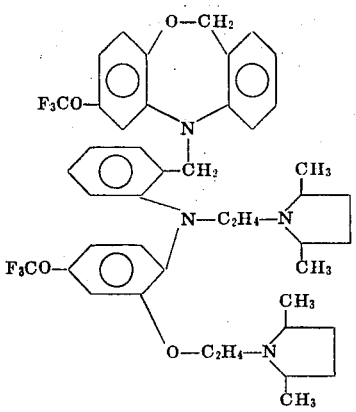 |
| 18. 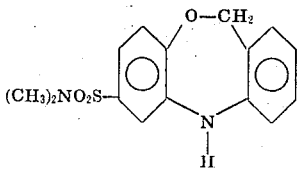 | 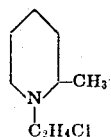 | 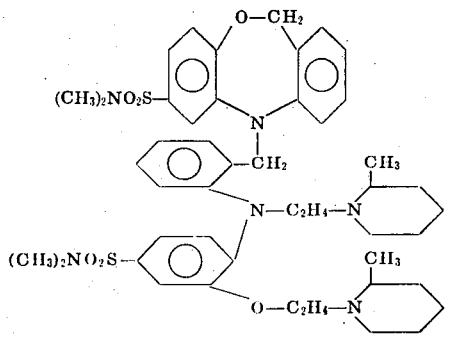 |
| 19. 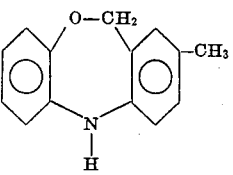 | 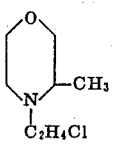 | 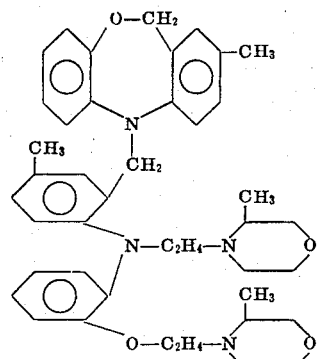 |
| 20. 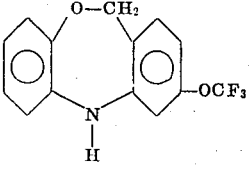 | 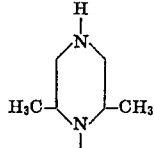 | 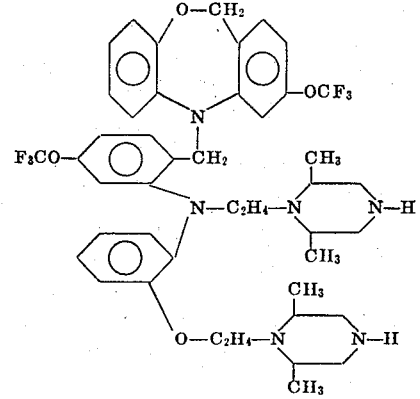 |

| | I  Oxazepine | II  B—A—Cl | III  Product |
|---|---|---|---|
| 21 | [dibenz-oxazepine with F] | thiomorpholine with CH₃, N-C₂H₄Cl | [product structure] |
| 22 | [dibenz-oxazepine with CF₃] | HOC₂H₄OC₂H₄—N(piperazine)N—C₂H₄Cl | [product structure] |
| 23 | [dibenz-oxazepine] | pyrrolidine with OCH₃, CH₃, N-C₂H₄Cl | [product structure] |
| 24 | [dibenz-oxazepine] | morpholine with OC₂H₅ groups, N-C₂H₄Cl | [product structure] |

EXAMPLE 25 (Comparative)

5 - (3 - Dimethylaminopropyl) - 5,11 - Dihydrodibenz [b,e] [1,4] Oxazepine.

A stirred mixture of 0.04 mole of 5,11-dihydrodibenz-[b,e][1,4]oxazepine, 0.047 mole of a 50 percent sodium hydride dispersion in mineral oil, and 200 ml. of dry xylene is heated under reflux for one hour and cooled. 3-Dimethylaminopropyl chloride (0.06 mole) is then added dropwise and the resulting mixture heated under reflux for 5 hours. The reaction mixture is then filtered, cooled and extracted with two 200 ml. portions of 5 percent hydrochloric acid. The combined acid extracts are made strongly basic with solid potassium carbonate and extracted with ether. After drying, the ether is removed to give about 13.3 g. of residue. Distillation gives a yellow oil, B.P. about 138°–143°(0.15 mm).

Both the residue and the distillate are tested separately for the presence of 5-[o-[o-[3-(dimethylaminopropoxy]-N-[3-(dimethylamino)propyl]anilino]benzyl]-5,11-dihydrodibenz[b,e]1,4]oxazepine, but each is found to be free of said compound. This shows that the foregoing compound is not formed when the sodium hydride and aminoalkyl halide are not present in molar quantities at least twice that of the oxazepine compound.

EXAMPLE 26 (Comparative)

5 - (2 - Dimethylaminoethyl) - 5,11 - Dihydrodibenz [b,e] [1,4] Oxazephine Maleate.

To a solution of 0.05 mole of 5,11-dihydrodibenz[b,e][1,4]oxazepine in 100 ml. of dry tetrahydrofuran, under nitrogen, is added 24 ml. of 2-dimethylaminoethyl chloride followed by 0.07 mole of a 50 percent dispersion of sodium hydride in mineral oil. The mixture is refluxed for four hours, cooled and filtered. The filtrate is concentrated to dryness and the residue is dissolved in acetone and an acetone solution of maleic acid is added. Ether is added to crystallize the product, 5-(2-dimethylaminoethyl)-5,11-dihydrodibenz[b,e]1,4]oxazepine maleate.

Both the foregoing product and the mother liquor are tested separately for the presence of 5-[o-[o-[2-(dimethylamino)ethoxy]-N-[2-(dimethylamino)ethyl]anilino]benzyl]5,11-dihydrodibenz[b,e][1,4]oxazepine, but each is found to be free of said compound. This shows that the foregoing compound is not formed when the sodium hydride and aminoalkyl halide are not present in molar quantities at least twice that of the oxazepine compound.

What is claimed is:

1. A compound selected from the group consisting of bases of the formula

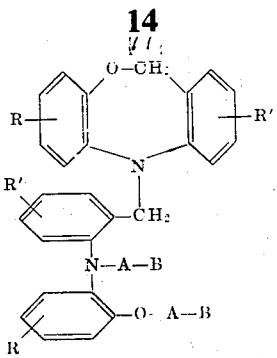

wherein A is a lower alkylene of at least two carbon atoms, B is a basic saturated nitrogen-containing radical of less than 12 carbon atoms selected from the group consisting of (lower alkyl)amino; di(lower alkyl)amino; (hydroxy-lower alkyl)amino; di(hydroxy-lower alkyl)amino; and basic saturated five to six membered N-heterocyclic radicals of less than 12 carbon atoms selected from the group consisting of piperidyl, (lower alkyl)piperidyl, di(lower alkyl)piperidyl, (lower alkoxy)-piperidyl, pyrrolidyl, (lower alkyl)pyrrolidyl, di(lower alkyl)-pyrrolidyl, (lower alkoxy)pyrrolidyl, morpholinyl, (lower alkyl)morpholinyl, di(lower alkyl)-morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)piperazyl, di(lower alkyl)piperazyl, (lower alkoxy)piperazyl, (hydroxy-lower alkyl)piperazyl, (lower alkanoyloxy-alkyl)piperazyl, (hydroxy-lower alkoxy-lower alkyl)piperazinyl, and (carbo-lower alkoxy)piperazyl, and R and R' are each selected from the group consisting of hydrogen, halogen, lower alkyl, lower alkoxy, trifluoromethyl, trifluoromethylmercapto, trifluoromethoxy and N,N-dimethylaminosulfonyl; and non-toxic acid-addition salts thereof.

2. A compound in accordance with claim 1 having the name 5-[o -[o -[Di(lower alkyl)amino](lower alkoxy)]-N-[di-(lower alkyl)amino](lower alkyl)]anilino]benzyl]-5-N-dihydrodibenz [b,e][1,4]oxazepine.

3. A non-toxic acid-addition salt of the compound of claim 2.

4. A compound in accordance with claim 1 having the name 5-[o -[o [2-(Dimethylamino)ethoxy]-N-[2-(dimethylamino) ethyl]anilino]benzyl]-5,11-dihydrodibenz[b,e][1,4]oxazepine.

5. A non-toxic acid-addition salt of the compound of claim 4.

6. The hydrochloride salt of the compound of claim 4.

7. A method of preparing a compound of claim 1 which comprises adding slowly to an oxazepine compound of the formula

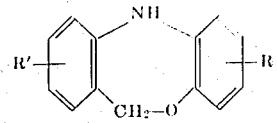

in tetrahydrofuran sequentially about one equivalent of sodium hydride, then about one equivalent of an aminoalkyl halide of the formula B—A—halide wherein B and A are as defined in claim 1 and adding slowly to the thus formed reaction mixture about 1 equivalent of sodium hydride, and then about 1 equivalent of an aminoalkyl halide of the formula B—A—halide wherein B and A are as defined in claim 1.

* * * * *

UNITED STATES PATENT OFFICE
CERTIFICATE OF CORRECTION

Patent No. 3,714,192  Dated January 30, 1973

Inventor(s) Harry L. Yale et al.

It is certified that error appears in the above-identified patent and that said Letters Patent are hereby corrected as shown below:

Column 1, line 34, "y0lower" should read --y-lower--.
Column 3, line 33, "dihydrobenz" should read --dihydrodibenz--.
Column 3, line 36, "5-[o-[-[2-" should read --5-[o-[o-[2- --.
Column 3, line 41, "536,72" should read --536.72--.
Column 3, line 66, "[b,e]1,4]" should read --[b,e][1,4]--.
Column 4, line 8, "2[2-(dimethyl)" should read
       --2-[2-(dimethylamino)--.
Column 4, line 30, "ethoxyl" should read --ethoxy--.
Column 4, line 41, "5-]o" should read --5-[o--.
Column 4, line 43, "nilino" should read --anilino--.
Column 4, line 54, "ropoxy" should read --propoxy--.
Column 4, line 55, "ropyl" should read --propyl--.
Column 13, line 40, "Oxazephine" should read --Oxazepine--.
Column 13, line 53, "[b,e]1,4]" should read --[b,e][1,4]--.

Signed and sealed this 3rd day of July 1973.

(SEAL)
Attest:

EDWARD M. FLETCHER, JR.      Rene Tegtmeyer
Attesting Officer            Acting Commissioner of Patents